(12) United States Patent
Morey

(10) Patent No.: US 10,017,024 B2
(45) Date of Patent: Jul. 10, 2018

(54) TABLET COMPUTER-BASED ROBOTIC SYSTEM

(71) Applicant: X Development LLC, Mountain View, CA (US)

(72) Inventor: Christopher Lynn Morey, San Francisco, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 15/448,783

(22) Filed: Mar. 3, 2017

(65) Prior Publication Data

US 2017/0177005 A1   Jun. 22, 2017

Related U.S. Application Data

(63) Continuation of application No. 14/483,073, filed on Sep. 10, 2014, now Pat. No. 9,623,715.

(51) Int. Cl.

| | |
|---|---|
| *B60R 99/00* | (2009.01) |
| *G05D 1/02* | (2006.01) |
| *B62D 55/06* | (2006.01) |
| *B62D 55/07* | (2006.01) |
| *B60G 17/016* | (2006.01) |
| *B62D 55/075* | (2006.01) |

(52) U.S. Cl.
CPC ............ *B60G 17/016* (2013.01); *B60R 99/00* (2013.01); *B62D 55/06* (2013.01); *G05D 1/0246* (2013.01); *B62D 55/075* (2013.01); *G05D 2201/0207* (2013.01); *G05D 2201/0209* (2013.01); *Y10S 901/01* (2013.01)

(58) Field of Classification Search
CPC ............ B62D 55/075; G05D 1/0246; G05D 2201/0207; G05D 2201/0209; Y10S 901/01
See application file for complete search history.

(56) References Cited

U.S. PATENT DOCUMENTS

| | | | |
|---|---|---|---|
| 6,263,989 B1 | 7/2001 | Won | |
| 7,164,970 B2 | 1/2007 | Wang et al. | |
| 8,316,972 B2 | 11/2012 | Hutcheson et al. | |
| 8,644,991 B2 * | 2/2014 | Ohm | G05D 1/0246 180/9.3 |
| 2008/0183332 A1 * | 7/2008 | Ohm | G05D 1/0246 700/250 |

(Continued)

*Primary Examiner* — Thomas P Ingram
(74) *Attorney, Agent, or Firm* — McDonnell Boehnen Hulbert & Berghoff LLP

(57) ABSTRACT

An example robotic chassis may include a frame including a first side member and a second side member connected by a transverse member near respective first ends of first side member and the second side member. The robotic chassis may also include a rigid case having a mounting point for a tablet computer. The rigid case may be rotatably coupled between the side members near respective second ends of the side members. The robotic chassis may further include a first arm and a second arm having respective distal ends and respective proximal ends. Respective proximal ends of the first arm and the second arm may be rotatably coupled to the frame near opposite respective first ends of the first side member and the second side member. In addition, the robotic chassis may include a plurality of wheels rotatably coupled to the frame.

20 Claims, 15 Drawing Sheets

(56) References Cited

U.S. PATENT DOCUMENTS

| | | | |
|---|---|---|---|
| 2012/0182680 A1* | 7/2012 | Wetzel | F16M 11/105 361/679.06 |
| 2014/0009561 A1* | 1/2014 | Sutherland | B25J 5/007 348/14.05 |
| 2014/0042199 A1* | 2/2014 | Gregory, Jr. | B60R 7/02 224/401 |
| 2014/0166377 A1 | 6/2014 | Terrien et al. | |

* cited by examiner

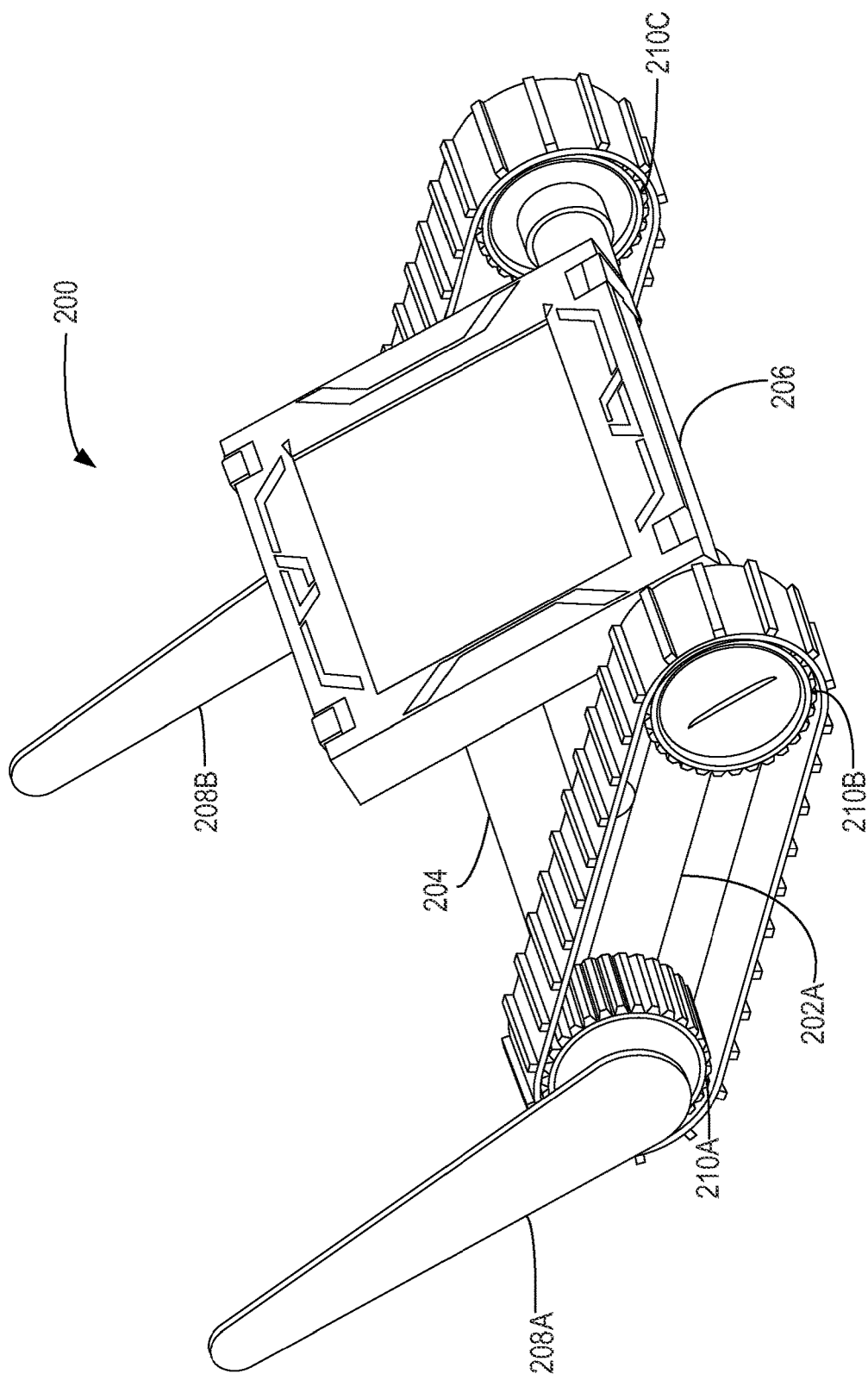

TABLET COMPUTER-BASED ROBOTIC SYSTEM

CROSS REFERENCE TO RELATED APPLICATION

The present application is a continuation of U.S. patent application Ser. No. 14/483,073 filed on Sep. 10, 2014, entitled "Tablet Computer-Based Robotic System," the contents of which are incorporated herein by reference, as if fully set forth in this description.

BACKGROUND

Robotic devices may include control systems that are communicatively coupled to various sensors. For instance, an example robot may include one or more of an accelerometer, an inertial measurement unit, or a GPS sensor, which may generate data that the control system may use for various tasks, such as navigating an environment. The example robot device may also include a camera, illumination (from a device such as an LED), a speaker, and a microphone, which may be used for various applications, such as surveillance, telepresence, or search and rescue.

Like robotic devices, tablet computers may include control systems that are communicatively coupled to various sensors. For instance, an example tablet computer may include one or more of an accelerometer, an inertial measurement unit, or a GPS sensor, which may generate data that the control system may use for various tasks, such as mapping. Tablet computers may also include one or more cameras (e.g., a front-facing and a rear-facing camera), which may be used for various applications, such as photography or video conferencing.

SUMMARY

An example robotic system may include a robotic chassis and a tablet computer. The robotic chassis may include a mounting point for the tablet computer, such that the tablet computer may be mounted on the robotic chassis. Various components of the robotic system may rotate around parallel axis, which may facilitate various operations of the robotic system. For instance, a rigid case that includes the mounting for the tablet computer may rotate about a first transverse axis between two side members of a frame of the robotic chassis. Additionally, in some implementations, one or more arms may rotate about a second transverse axis. The first transverse axis and the second transverse axis may be located at opposite ends of the frame, which may provide facilitate positioning the robotic chassis in various configurations.

In one example implementation, a robotic chassis may include a frame having a first side member and a second side member connected by a transverse member near respective first ends of first side member and the second side member. The robotic chassis may also include a rigid case having a distal end and a proximal end and a mounting point for a tablet computer. The proximal end of the rigid case may be rotatably coupled between the side members near respective second ends of the side members. The robotic chassis may further include a first arm and a second arm having respective distal ends and respective proximal ends. Respective proximal ends of the first arm and the second arm may be rotatably coupled to the frame near opposite respective first ends of the first side member and the second side member. In addition, the robotic chassis may include a plurality of wheels rotatably coupled to the frame.

In another example implementation, a plan to move a robotic chassis to a target position may be determined. The target position may include a target orientation of a tablet computer. Based on the determined plan, a rotation of a rigid case having a proximal end that is rotatably coupled between respective side members of the robotic chassis at respective first ends of the side members may be initiated between the side members about a first transverse axis. After initiating the rotation of the rigid case about the first transverse axis, the implementation may involve determining that the tablet computer is at the target orientation based on data from at least one orientation sensor of a tablet computer. In response to determining that the tablet computer is at the target orientation, the implementation may involve halting the rotation of the rigid case about the first transverse axis to position the tablet computer in the target orientation.

Another example implementation may involve determining a target position for a rigid case having a proximal end that is rotatably coupled between side members of a frame of the robotic device at respective first ends of the side members. The target position may include a target height of the rigid case from a support surface and a target angle between the rigid case and the support surface and the rigid case may include a mounting point for a tablet computer. The implementation may involve causing the rigid case to rotate between the side members about a first transverse axis to orient the rigid case at the target angle between the rigid case and the support surface. The implementation may involve causing a first arm and a second arm that are rotatably coupled to the robotic device at the respective second ends of the side members to rotate outside the side members and downward towards the support surface about a second transverse axis that is parallel to the transverse member and to the first transverse axis to lift the rigid case upwards to the target height of the rigid case from the support surface.

Another example implementation may include a means for determining a plan to move a robotic chassis to a target position that includes a target orientation of a tablet computer. Based on the determined plan, the implementation may include a means for initiating a rotation of a rigid case having a proximal end that is rotatably coupled between respective side members of the robotic chassis at respective first ends of the side members between the side members about a first transverse axis. The implementation may also include a means for determining that the tablet computer is at the target orientation based on data from at least one orientation sensor of the tablet computer. The implementation may further include a means for halting the rotation of the rigid case about the first transverse axis to position the tablet computer in the target orientation.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 2B is a perspective view of the example robotic system in a second configuration.

DETAILED DESCRIPTION

Figure 1:
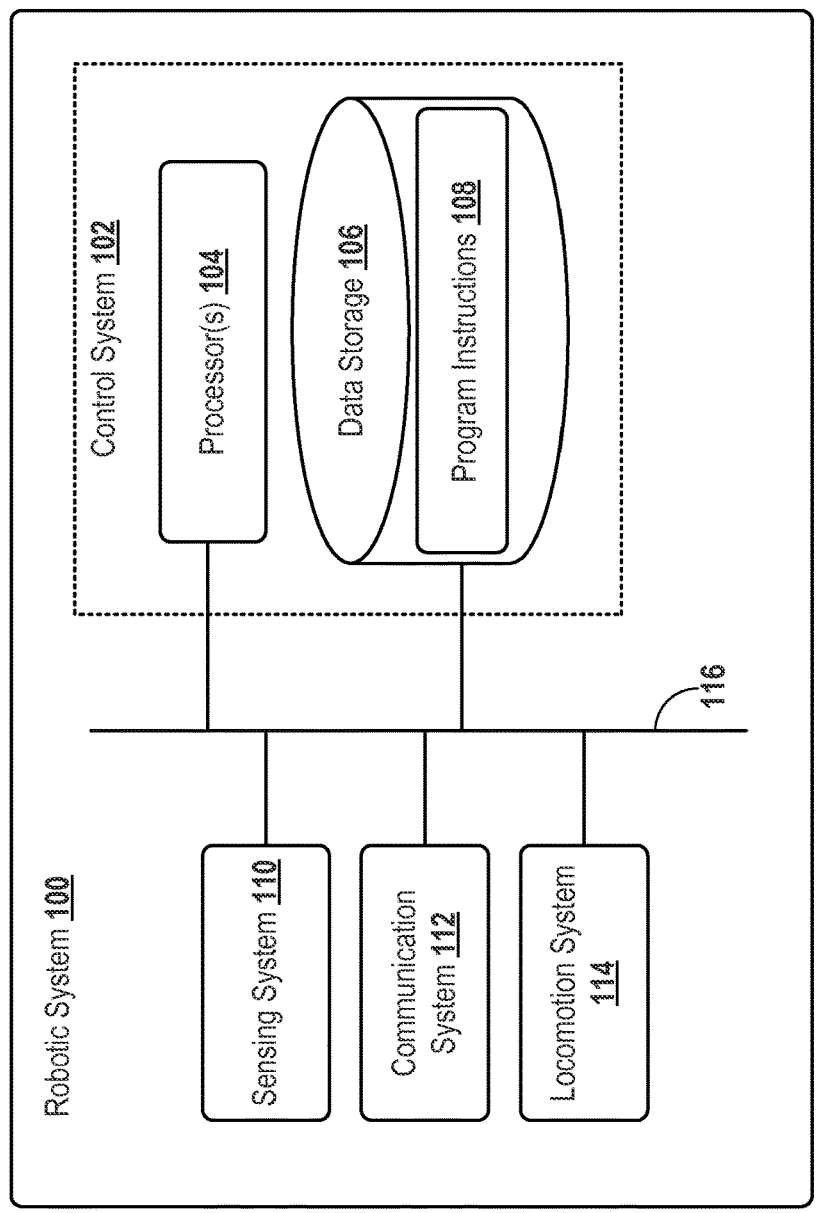
FIG. 1 is a simplified block diagram illustrating components of an example robotic system.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the figures should not be viewed as limiting. Other implementations might include more or less of each element shown in a given figure. Further, some of the illustrated elements may be combined or omitted. Yet further, an example implementation may include elements that are not illustrated in the figures.

An example robotic system may include a robotic chassis and a tablet computer. The robotic chassis may include a mounting point for the tablet computer, such that the tablet computer may be mounted on the robotic chassis. When arranged in the mounting point of the robotic chassis, the tablet computer may perform various functions on behalf of the robotic system. For instance, the tablet computer may control aspects of one or more sub-systems of the robotic device, such as a locomotion system or a sensing system. Alternatively, the tablet computer may include one or more sensors and may capture sensor data by way of such sensors. Such sensor data may facilitate various operations of the robotic system, such as navigating an environment. In some cases, the robotic system may be implemented using a commercially available tablet computer. Such a tablet computer may provide a convenient computational and/or sensing platform for the robotic system.

In some implementations, the robotic chassis may include a frame that has various members. For instance, the frame may include two side members. The side members may be connected by one or more transverse members extending between the side members. In one instance, the frame may include a first side member and a second side member connected by a transverse member near respective first ends of the first side member and the second side member, which may form a U-shaped frame.

One or more wheels may be connected to the frame. The wheels may be driven by one or more actuators, which may facilitate navigating the robotic system around an environment. In some implementations, the wheels may be configured with tracks, which may improve traction in some circumstances.

The robotic chassis may include a rigid case, which may include the mounting point for the tablet computer. In some instances, the rigid case may include a front shell and a rear shell that, when connected together, define an interior volume in which a tablet computer may be arranged. The front shell and the rear shell may be connected using any suitable connection mechanism, such as one or more latches.

The rigid case may be rotatably coupled about a transverse axis between two side members of the frame of the robotic chassis, such as the first side member and the second side member noted above. The rigid case may be rotatable 360 degrees about the transverse axis, perhaps driven by one or more actuators (e.g., one or more electric motors). The transverse axis may extend from between respective second ends of the side members, opposite the transverse member (e.g., between the tips of the U-shaped frame).

Rotatably coupling the rigid case about the transverse axis may have several advantages. For instance, rotation of the rigid case may reposition sensors of the tablet computer. In one example, the tablet computer may include a camera, and rotation of the rigid case may change the viewing angle of the camera lens. Additionally, rotating the rigid case may shift the center of gravity of the robotic system and/or support an end of the frame on the rigid case, which may facilitate navigation around an environment. For instance, rotating the rigid case may assist the robotic system in navigating over obstacles.

The robotic chassis may include one or more arms that are rotably coupled to the frame. The arms may rotate about another transverse axis that is parallel to the traverse axis about which the rigid case may rotate. In some implementations, the arms may rotate outside of the first and second side members. This arrangement may allow both the arms and the rigid case to rotate 360 degrees concurrently without coming into contact with one another. The arms may facilitate navigation around the environment.

Rotation of the arms and/or the rigid case may facilitate moving the robotic system to a target position. For instance, the tablet computer may determine a target position, which may include a target orientation and/or a target height of the tablet computer. The robotic system may rotate the rigid case, one or more of the arms, and one or more of the wheels to move the computer to the tablet position. Sensors of the tablet computer may generate positioning data, which may facilitate determining that the tablet computer is in the target position.

The robotic chassis may include various features that may enhance the ruggedness of the robotic system. For instance, the rigid case may include one or more gaskets that increase the water-resistance of the tablet computer. The chassis may include various impact absorbing materials, such as shock absorbing wheels, tracks, or bumpers. Further, the chassis may be composed of one or more durable materials, such as a rigid plastic or a metal, such as aluminum.

In some cases, the robotic system may be communicatively coupled to a second tablet computer. The second tablet computer may include a touchscreen or other suitable input interface. The second tablet computer may detect input at the touchscreen that indicates various commands for the robotic system. The second tablet computer may then transmit these commands to the robotic system, which may cause the robotic system to perform various operations. Further, a camera on robotic system may stream video to the second tablet computer. The second tablet computer may display the streamed video on the touchscreen or another graphical interface, thereby providing a view from a perspective of the robotic system.

In some cases, the robotic system may be communicatively coupled with multiple other instances of the robotic system. A particular one of the instances may control certain aspects of the behavior of the other robotic systems in the swarm. For instance, a tablet computer mounted in the mounting point of the particular robotic system may provide controls to modify one or more operations of the robotic systems in the swarm.

Referring now to the figures, FIG. 1 is a simplified block diagram illustrating components of an example robotic device 100. The robotic device 100 may include a control system 102, a sensing system 110, a communication system 112, and a locomotion system 114. One or more of these components may be interconnected by a bus or other interconnection system 116. Each of these systems may be divided into one or more components, which may be physically located in a tablet computer or a robotic chassis, among other possibilities.

The control system 102 may include one or more processors 104, non-transitory data storage 106, and program instructions 108 stored on the data storage 106. The one or more processors 104 may, for example, include a single or multi-core processor, an application specific integrated circuit (ASIC), field programmable gate array (FPGA), and/or any other suitable circuitry. The program instructions 108 stored on the data storage 106 may be executable by the one or more processors 104 to perform specific operations, which may include the specific operations described herein. In some implementations, robotic system 100 may include multiple instances of control system 102, which may be communicatively coupled with one another. For example, a first tablet computer may include a first instance, a second tablet computer may include a second instance, and a robotic chassis may include a third instance of control system 102. Other examples are possible as well.

The sensing system 110 may include sensors arranged to sense aspects of the environment in which the robotic system 100 is operating. The sensing system 110 may connect to the control system 102 and thereby provide the control system 102 with data from the sensors. The control system 102 may track and store this sensor data and make operational determinations based on the tracked sensor data. Sensors of sensing system 110 may be physically located on the tablet computer or on the robotic chassis. Some commercially available tablet computers include sensors that may have application to a robotic system, such as an accelerometer, a global positioning system (GPS) sensor, or a camera, among other examples of sensors. Such sensors may be communicatively coupled to a processor of the tablet computer, such that the processor may receive data generated by the sensors.

The sensing system 110 may include one or more position, velocity, or acceleration sensors. For instance, the sensing system 110 may include an accelerometer. While an accelerometer may be included in a tablet computer for various tasks such as drop detection or screen rotation, the accelerometer may facilitate navigation and other tasks when the tablet computer is incorporated into a robotic system. Alternatively, the sensing system 110 may include an inertial measurement unit (IMU). The inertial measurement unit may sense the robotic device's velocity, orientation, and acceleration. The sensing system 110 may further include one or more global positioning system (GPS) devices, which may be used in mapping applications on the tablet computer. As part of the robotic system, the GPS may sense the absolute position of the robotic system. The control system 102 may use GPS data to determine the robotic system's speed or direction, possibly in combination with data from an IMU or accelerometer.

The sensing system 110 may include one or more perception sensors arranged to sense the environment in which the robotic system 100 is operating. As part of the tablet computer, such sensors may be used in photography or video conferencing applications. Incorporated into the robotic system 100, such sensors may sense physical features of the environment, such as the terrain, vegetation, man-made objects and structures, and the like. For instance, the sensing system 110 may include one or more cameras that may generate imaging data of the environment in which the robotic system is operating. In operation, one or more stereo cameras may generate three-dimensional images of the physical features of the environment. The control system may evaluate the three-dimensional images to identify the physical features and their position relative to the robotic system. In some implementations, the perception sensors may include one or more lidar systems. Such lidar systems may generate data indicating a map or model of the physical features of the environment, which may then be used by the control system to navigate the robotic device, perhaps in combination with sensor data from the other sensors. The perception sensors may also include one or more range finders, such as one or more laser range finders, which may generate data indicating distances from the robotic device to the physical features of the environment. The sensing system 110 may include other types of perception sensors as well.

The communication system 112 may include one or more wired or wireless communication interfaces that operate according to one or more communications protocols to facilitate data communications among components of the robotic system (e.g., between the tablet computer and the robotic chassis) and between the robotic system and other systems (e.g., between the tablet computer of the robotic system and a tablet computer used as a control device for the robotic system). For example, the communication system 112 may include a Wi-Fi communication component that is configured to facilitate wireless data communication according to one or more IEEE 802.11 protocols. Alternatively, the communication system 112 may include a cellular radio communication component that is configured to facilitate wireless communication (voice and/or data) with a cellular wireless base station to provide mobile connectivity to a network. Further, the communication system may include a BLUETOOTH® communications component. Many other communication interfaces are known and available and the robotic system may include any suitable communication interface now known or later developed.

The locomotion system 114 may include one or more wheels. In some implementations, the locomotion system may include four wheels. The four wheels may include two left wheels coupled to a first side member and two right wheels connected to a second side member. The right wheels and the left wheels may be linked with respective tracks. The tracks may facilitate navigating over uneven terrain, such as terrain that includes obstacles. The four wheels may be connected at respective ends of the side members, such that the locomotion system 114 includes two front wheels and two rear wheels. The locomotion system 114 may further include one or more actuators, which may drive one or more of the wheels. In some examples, the one or more actuators may include electric motors, perhaps operated by a battery mounted on the robotic system 100.

Figure 2A:
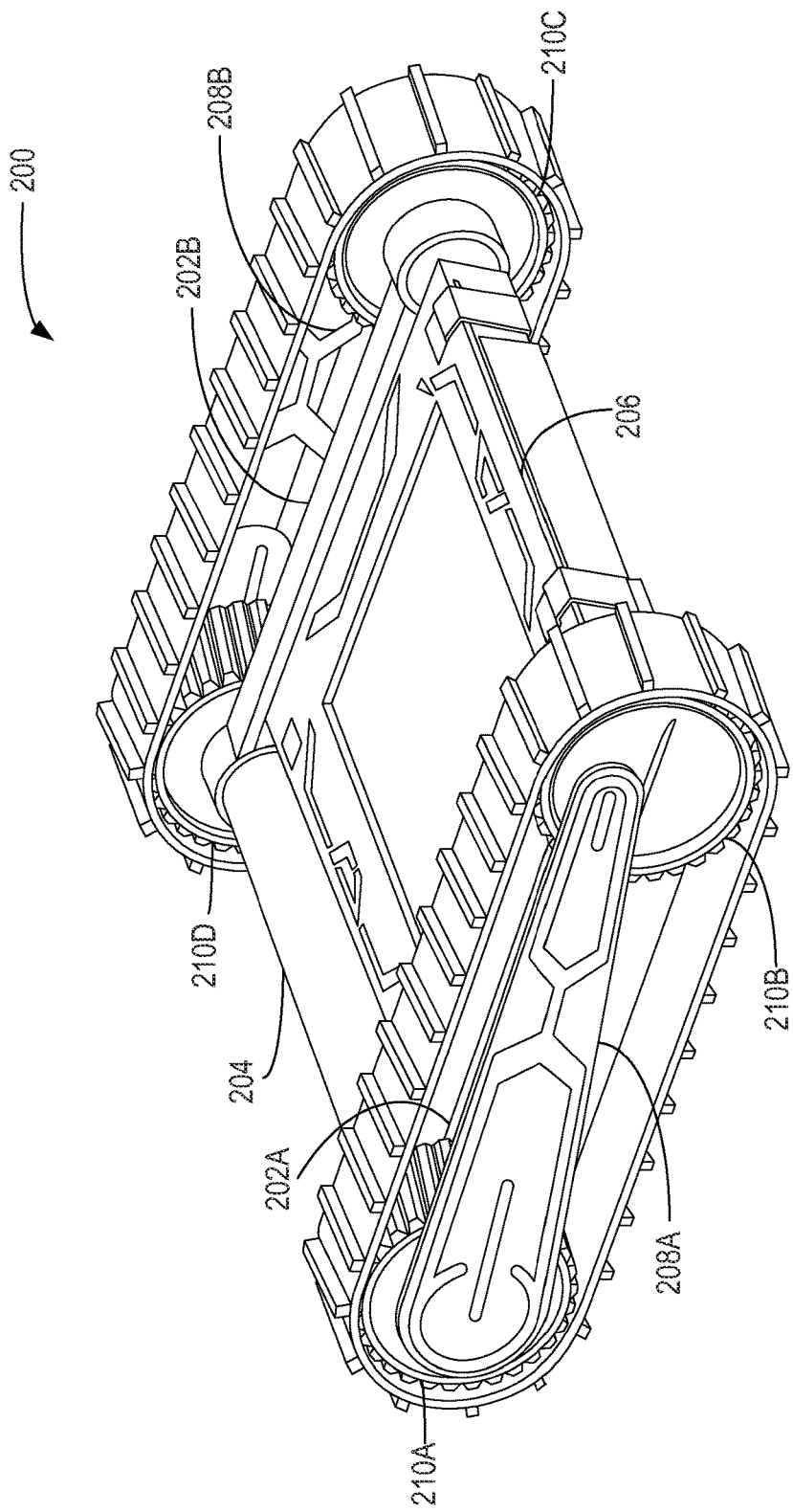
FIG. 2A is a perspective view of an example robotic system in a first configuration.

FIG. 2A is a perspective view of an example robotic chassis, which may be an instance of the robotic system 100 of FIG. 1. Robotic chassis 200 includes a frame, a rigid case 206, arms 208A and 208B, and wheels 210A, 210B, 210C, and 210D, as shown.

The frame includes a first side member 202A, a second side member 202B, and a transverse member 204 connecting the first side member 202A to the second side member 202B at respective first ends of the first side member 202A and the second side member 202B. The frame may be composed of a variety of materials, such as plastic or metal. In some cases, members of the frame may be fully or partially hollow, such that the members define volumes in which various components such as actuators, communications interfaces, sensors, and/or power storage systems (e.g., batteries) may be contained. In some implementations, the first side member 202A, the second side member 202B, and the transverse member 204 may be chosen such that they are narrower than the diameter of the wheels 210A, 210B, 210C, and 210D, as shown. Such a design may allow the robotic system to operate (e.g., navigate) after flipping over.

As further show in FIG. 2A, the rigid case 206 is rotatably coupled between the first side member 202A and the second side member 202B at respective first ends of the first side member 202A and the second side member 202B. The rigid case 206 may rotate about a first transverse axis that is parallel to the transverse member 204. One or more actuators may rotate the rigid case. Such actuators may be located within side member 202A and/or side member 202B, among other alternatives.

Further, the rigid case 206 has a first end that is rotatably coupled to the first side member 202A and the second side member 202B (i.e., a proximal end). Such a configuration allows rotation of the rigid case 206 in a circular pattern having a radius that is approximately proportional to a length of the rigid case 206. The length of the rigid case 206 extends from the proximal end of the rigid case 206 to a distal end of the rigid case 206 that is opposite the proximal end. In other implementations, the rigid case 206 may be coupled to the first side member 202A and the second side member 202B at various other locations along the length of the rigid case 206 and along respective lengths of the first side member 202A and the second side member 202B.

The rigid case 206 may include a mounting point for a tablet computer. The mounting point may include any suitable arrangement of components to hold the tablet computer. For instance, as noted above, the rigid case 206 may include a front shell and a rear shell that, when connected, define a volume that may contain the tablet computer. The front shell and the rear shell may be connected by latches, screws, or any suitable connection system.

In some cases, the rigid case 206 and/or the frame may be sized to the dimensions of a given tablet computer. For instance, a width of the rigid case 206 extends approximately from the first side member 202A to the second side member 202B, as shown. Further, the length of the rigid case extends approximately from the first transverse axis to the transverse member 204. In this arrangement, the first side member 202A, the second side member 202B, the transverse member 204, and the first transverse axis define a volume though which the rigid case may rotate, thereby allowing the rigid case 206 to rotate 360 degrees about the first transverse axis. In other implementations, the mounting point may be configured to accommodate tablet computers having different dimensions.

As noted above, rotation of the rigid case 206 about the first transverse axis may have various advantages. For instance, rotation of the rigid case 206 may reposition the tablet computer, which may in turn reposition one or more sensors of the tablet computer. Rotation of the rigid case 206 may also cause a shift in the center of gravity of the robotic chassis 200, which may facilitate navigating an environment. Further, rotation of the rigid case 206 may bring the rigid case 206 into contact with a support surface or other feature of the environment. Further rotation may support the respective second ends of the first side member 202A and the second side member 202B above the support surface or feature, which may assist in navigating over the support surface or past the feature. For instance, in some circumstances, the robotic chassis 200 may become hung-up or caught on a feature of the environment and rotation of the rigid case 206 may assist in freeing the robotic chassis 200 from the feature.

The arms 208A and 208B are rotatably coupled to the frame (in particular, to respective axles of wheels 210A and 210D, as shown). As shown, the arms 208A and 208B rotate about a second transverse axis that is parallel to the transverse member 204 and to the first transverse axis. In some implementations, arms 208A and 208B may rotate independently, perhaps driven by respective actuators. As noted above, the arms 208A and 208B are rotatably coupled to respective axles of wheels 210A and 210D. Such axles may include respective axle shafts (which may contain all or part of the actuators that drive the arms 208A and 208B), respective proximal axle ends that are coupled to the side members, and respective distal axle ends to which the arms 208A and 208B are rotatably coupled.

The arms 208A and 208B extend from respective proximal ends that are coupled to the frame to respective distal ends. The length of each arm from the proximal end to the distal end is approximately the same length as the first side member 202A and the second side member 202B. This sizing may have several advantages. For instance, as shown, arms 208A and 208B do not extend past wheels 210B and 210C when aligned parallel with the first side member 202A and the second side member 202B, which may protect the arms 208A and 208B should the robotic chassis 200 fall on the wheels 210B and 210C in certain ways.

The wheels 210A, 210B, 210C, and 210D rotate about respective axles. One or more actuators may rotate one or more of wheels 210A, 210B, 210C, and 210D. Rotation of the wheels may cause the robotic chassis 200 to navigate around the environment. A control system of the robotic system, such as control system 102, may cause the wheels to move the robotic chassis 200 to various locations, such as a target location, perhaps based on data from one or more sensors (e.g., a GPS, IMU, or accelerometer). Wheels 210A and 210B are linked by a first track. Likewise, wheels 210C and 210D are linked by a second track. Such tracks may improve traction in some circumstances, among other possible benefits.

FIG. 2A illustrates the robotic chassis 200 in an instance of a "stowed" configuration. In the stowed configuration, the rigid case 206 and the arms 208A and 208B are approximately parallel to the first side member 202A and the second side member 202B. Such a configuration may allow the robotic chassis 200 to operate after flipping over or navigate under certain obstacles overhanging the support surface, among other possible advantages.

A control system, such as control system 102, may cause the robotic device to transform into the stowed configuration. Such a transformation may involve rotating the arms 208A and 208B next to and substantially parallel with the side members 202A and 202B, as shown. The transformation may further involve rotating the rigid case next to and substantially parallel with the first side member and the second side member, also as shown. In some implementations, the respective angles between the arms and the side members may be less than 15 degrees and the respective angles between the rigid case and the side members are also less than 15 degrees. Other angles are possible as well, as relatively larger wheel diameters may allow larger angles between the components.

FIG. 2B is then an illustration of the robotic chassis 200 in an instance of a "case-forward" configuration. In the case-forward configuration, a front side of the rigid case 206 is facing away from arm 208A and 208B. In such a configuration, a front-facing camera of a tablet computer that is arranged in the mounting point of the rigid case 206 may provide a first-person viewpoint from a perspective of the robotic chassis 200.

In some circumstances, a control system, such as control system 102, may cause the robotic system to transform into the case-forward configuration. Such a transformation may involve rotating the distal ends of the arms above the proximal ends of the arms such that the arms are at respective angles to the first side member and the second side member and rotating the distal end of the rigid case above the proximal end of the rigid case such that the rigid case are at respective angles to the first side member and the second side member.

Figure 2C:
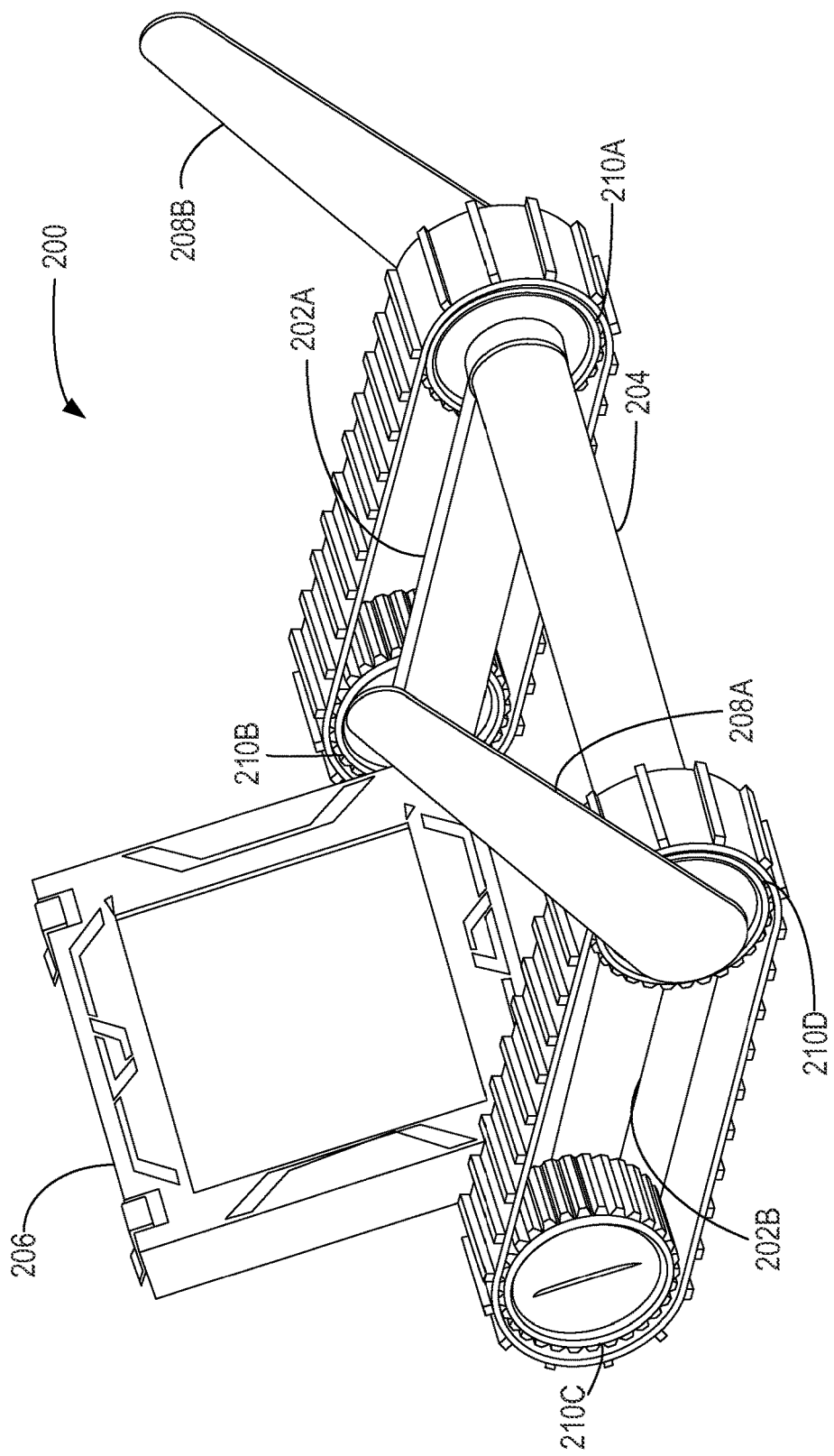
FIG. 2C is a perspective view of the example robotic system in a third configuration.

FIG. 2C next illustrates the robotic chassis 200 in an instance of an "arms-forward" configuration. In the arms-forward configuration, the rigid case 206 and the arms 208A and 208B are at respective angles to the first side member 202A and the second side member 202B. In such a configuration, arms 208A and 208B may show in a viewpoint of a front-facing camera on a tablet mounted in the rigid case 206, which may provide indicate the orientation of the robotic chassis 202 relative to the viewpoint of the front-facing camera.

In some circumstances, a control system, such as control system 102, may cause the robotic system to transform into the arms-forward configuration. Such a transformation may involve rotating the respective distal ends of arm 208A and 208B above the respective proximal ends of arm 208A and 208B such that the arms are at respective angles to the first side member and the second side member. The respective angles may be within a range from about 75 degrees to about 150 degrees. The transformation may further involve rotating the distal end of the rigid case above the proximal end of the rigid case. After such a rotation, respective angles between the rigid case and the first side member and the second side member may be within a range from about 85 degrees to about 105 degrees. Such angles may position the rigid case 206 and the arms 208A and 208B such that the arms 208A and 208B show in a viewpoint of a front-facing camera on a tablet mounted in the rigid case 206.

Figure 3A:
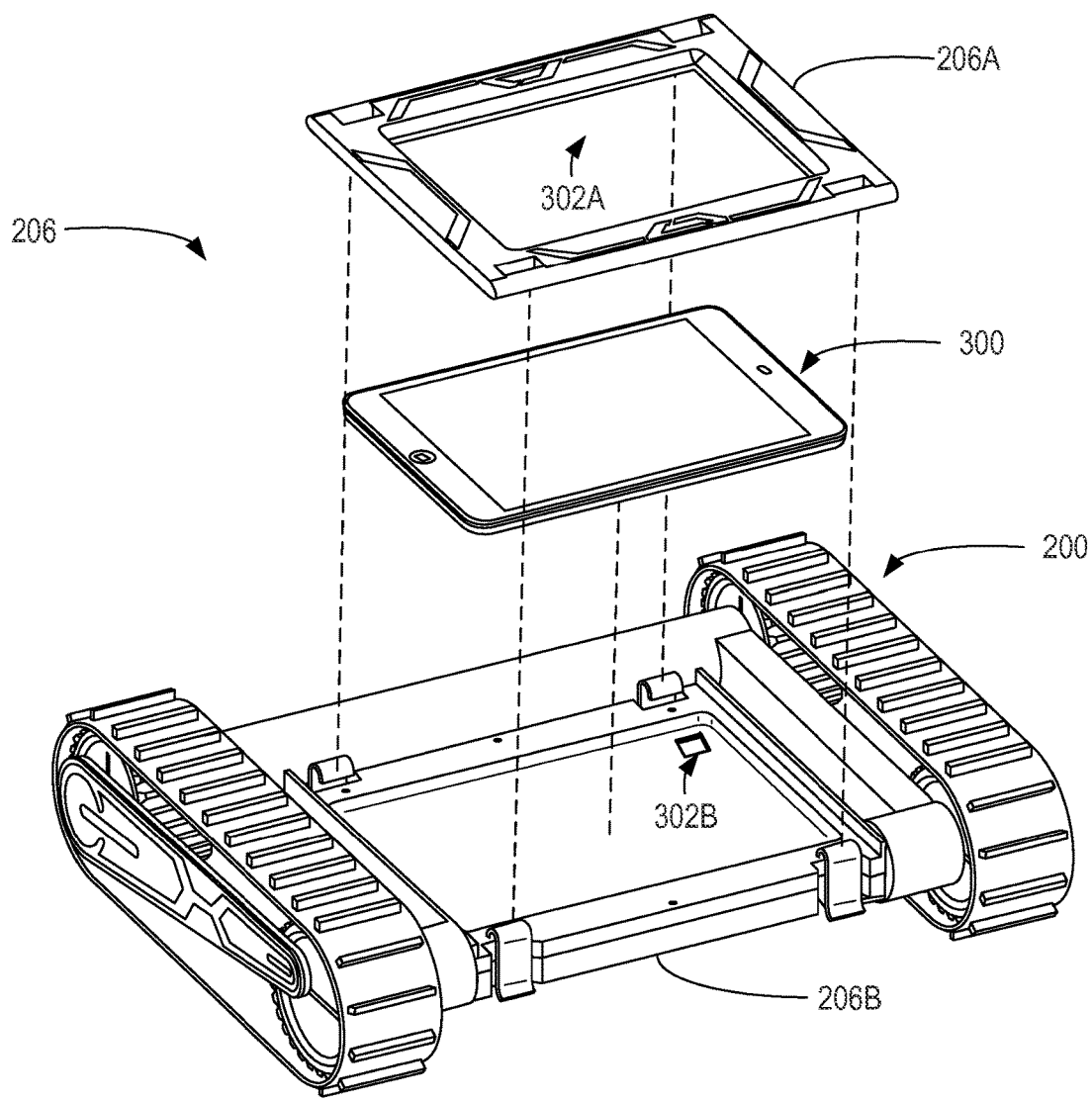
FIG. 3A is a deconstructed view of the example rigid case 206 in which the example rigid case is coupled to the robotic chassis.

FIG. 3A is a deconstructed view of the example rigid case 206. Rigid case 206 includes a front shell 206A and a rear shell 206B. The front shell 206A and the rear shell 206B may be connectable by latches, perhaps at one or more latch points. As noted above, when connected, the front shell 206A and rear shell 206B may define a volume in which a tablet computer may be mounted. For instance, the rear shell 206B may have a recessed cavity in which the tablet computer 306 may be placed. In such an example, mounting the tablet computer 306 may involve placing the tablet computer 306 into a rear shell 206B (which is rotatably coupled to the robotic chassis 200). The front shell 206A may then be placed on the rear shell 206B and latched to the rear shell 206B to contain the tablet computer 306.

The front shell 206A and the rear shell 300B may have various openings, which may facilitate operation of various components of a mounted tablet computer. For example, the front shell includes an opening 302A, which is configured to expose a touchscreen display of the tablet computer. The rear shell includes an opening 302B, which is configured to expose a rear-facing camera of the tablet computer and perhaps also an illumination device (e.g., one or more LEDs). Alternate sizes, shapes, and configurations of openings are possible and may depend on the tablet computer implemented in the robotic system. The openings may be covered by a sealed transparent window, which may provide water-resistance. In some cases, the rigid case 206 may be made of a transparent material such that various components of the tablet computer may operate through the case.

In some cases, a second instance of the tablet computer may be mounted in a second rigid case. In some implementations, the other rigid case may be a second instance of the rigid case. As noted above, in some cases, a second instance of the tablet computer may be used as a controller to the robotic system. To facilitate such a use, handles may be mounted on the second rigid case. For instance, a left handle and a right handle may be mounted on the left side and the right side of the rigid case 206, respectively. Such handles may provide surfaces that facilitate gripping of the tablet computer. Such handles may also have interior volumes that, when connected to the rigid case, may make the rigid case buoyant in some circumstances. Further, the handles may also reduce or eliminate damage from impacts. Such impact resistance may be enhanced in some cases by bumpers placed on one or more corners of the handles. To further facilitate control of the robotic system by a second instance of the tablet computer, the handles may include various controls, such as buttons or joysticks. Input from these controls may be translated into commands for the robotic system.

Figure 3B:
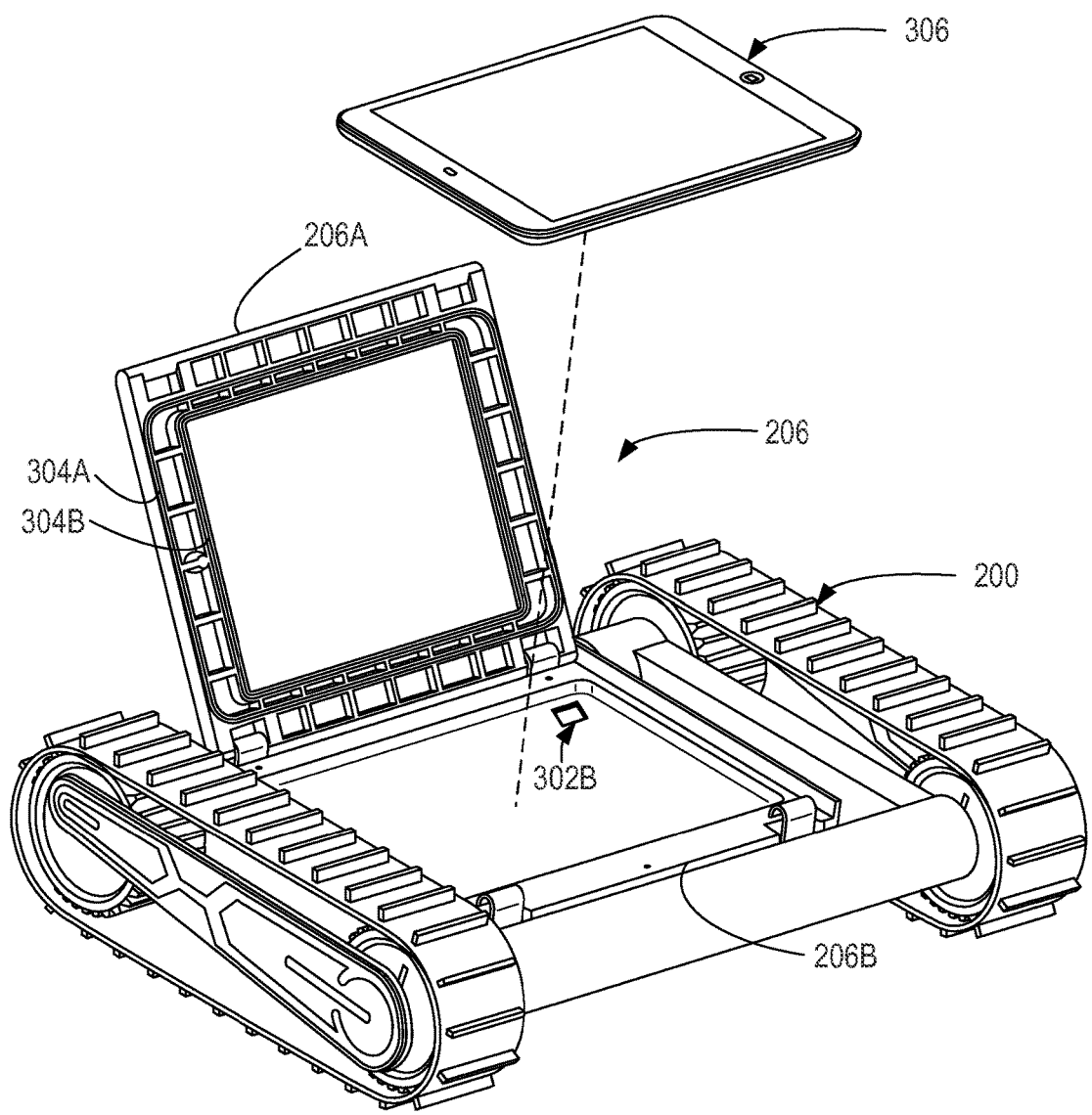
FIG. 3B shows an example arrangement in which a front shell of the rigid case is hinged to a rear shell of the case.

FIG. 3B illustrates an example arrangement of rigid case 206 in which the front shell 206A is hinged to the rear shell 206B. In such an arrangement, mounting the tablet computer 306 may involve rotating the front shell 206A away from the rear shell 206B about an axis that is formed by the hinges. In some cases, the rigid case 206 may include hinges on one edge and latches on the opposite edge. In other cases, the rigid case 206 may include latches on two (or more edges) and a subset of the latches may operate as hinges (i.e., allow the front shell 206A to rotate relative to the rear shell 206B).

The front shell 206A and/or the rear shell 206B may include respective gaskets. For instance, the front shell 206A may include gaskets 304A and 304B. Such gaskets may aid in preventing water damage to the tablet computer, as such gaskets may prevent water from coming into contact with certain parts of the tablet computer (e.g., seams into which water may seep). Additional environmental protection features may be included as well.

Figure 3C:
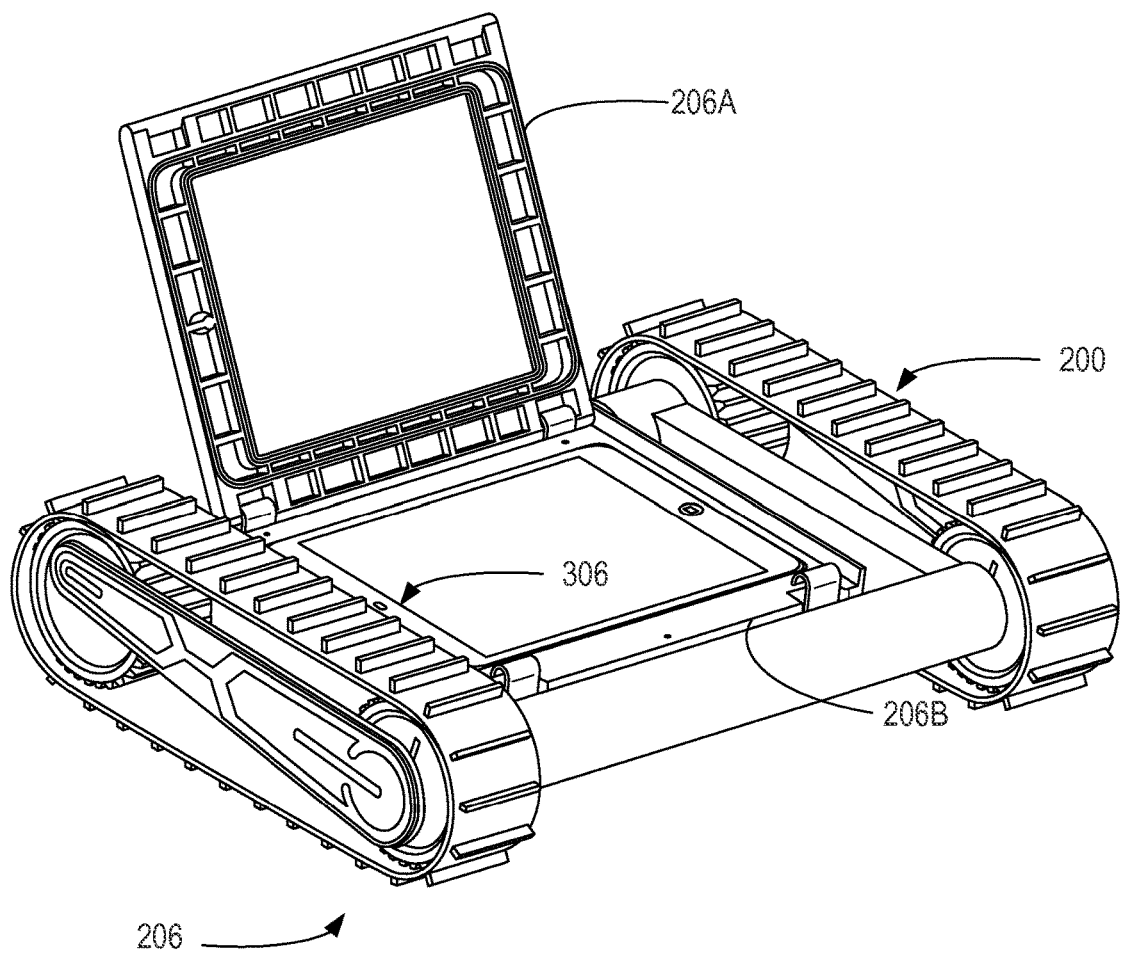
FIG. 3C shows the example arrangement where a tablet computer is placed in the rear shell.

As noted above, mounting may further involve placing the tablet computer on the rear shell 206B. FIG. 3C illustrates the tablet computer 306 after being placed on the rear shell 206B. Then, the front shell 206A may be rotated towards from the rear shell 206B so that the front shell 206A may be latched to the rear shell 206B.

Figure 4:
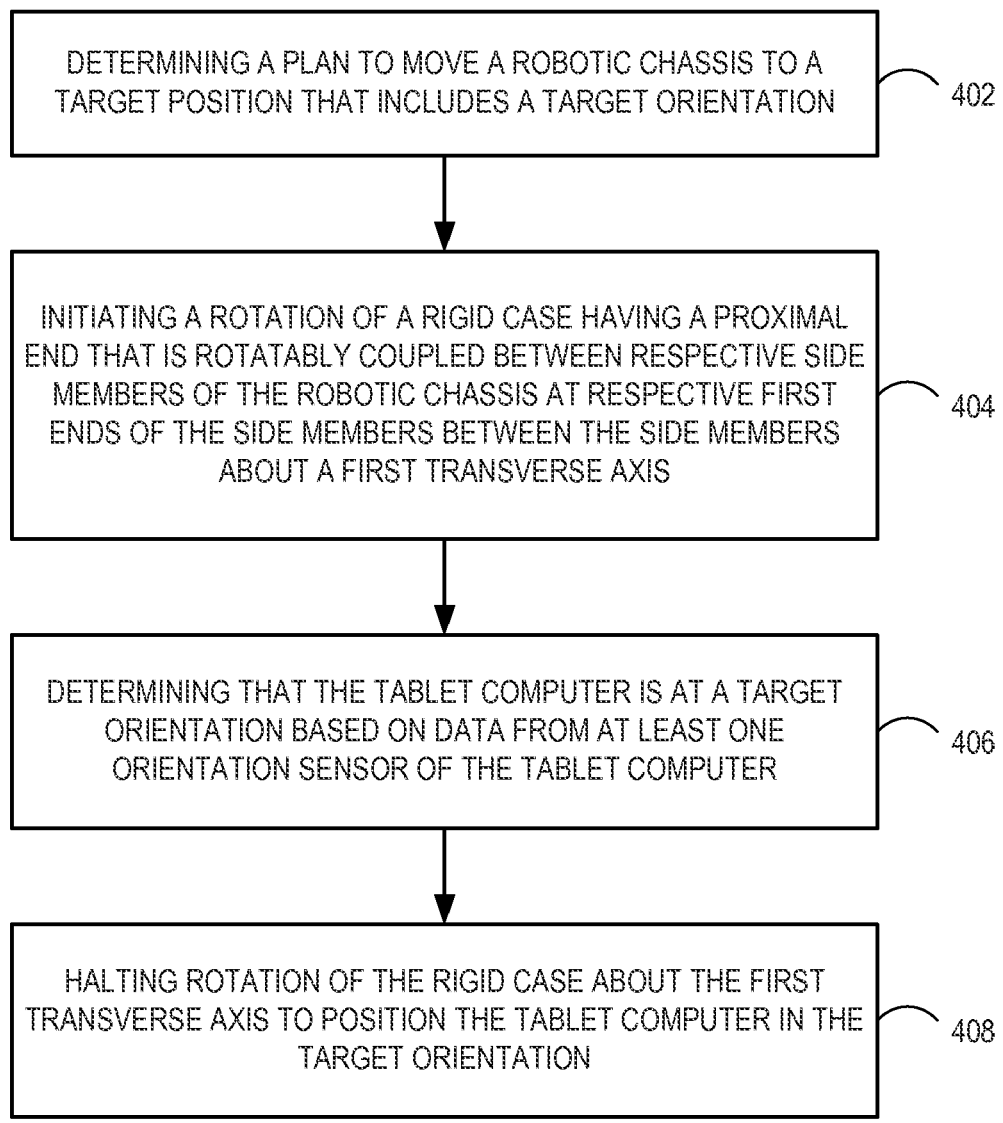
FIG. 4 is a flow chart illustrating an example method for positioning a tablet computer in a target position.

FIG. 4 is a flowchart illustrating example operations that may position a robotic device.

At block 402 in FIG. 4, the method may involve determining a plan to move a robotic chassis to a target position. For instance, control system 102 of FIG. 1 (perhaps implemented as one or more components of a tablet computer) may determine a plan to move the robotic chassis to a target position. The target position may include a target orientation, a target height, and/or a target location, among other examples.

In some examples, the determined target position may include a target orientation, target height, and/or target location of a tablet computer, as positioning a tablet computer may be advantageous in some circumstances. For instance, a tablet computer may be mounted in a mounting point of a rigid case. The tablet computer may have one or more sensors (e.g., one or more sensors of sensing system 110) and moving the tablet computer to the target position may alter respective perspectives of the sensors. After positioning the tablet computer in the target position, the sensors may produce data from the perspective of the target position.

For instance, the tablet computer may have a front-facing camera, and moving the tablet computer to the target position may point the front-facing camera at one or more objects that are to be the subject of a photograph or video captured by the front-facing camera. As one possible application is in home security in which a robotic system may position a camera at various heights, orientations, and locations to monitor a home. As another application, a robotic system may determine a plan to move to one or more target positions that are suitable for telepresence. As a further application, the control system may determine one or more target positions at which to observe a pet. Other applications are possible as well.

The tablet computer may determine a plan based on one or more received commands. For instance, the tablet computer may receive one or more command by way of a communication interface, such as communication interface 112. Such commands may direct the robotic system to perform various tasks, such as those noted above, among other examples. In other examples, the commands may indicate one or more aspects of the target position, such as a target height, a target location, or a target orientation, among other examples.

In some cases, the determined plan may be based on one or more features of the environment in which the robotic system is operating. For instance, the robotic system may detect the one or more features and then determine a plan to navigate up to, over, or around such features. In one example, the robotic system may detect a window and then determine a plan to position a camera of a tablet computer of the robotic system such that it is pointed out the window.

In other cases, the determined plan may be based on a state or configuration of the robotic system. As one example, the robotic system may detect that it is stuck, hung up, or otherwise obstructed by one or more features of the environment. For instance, perhaps based on IMU or GPS data the robotic system may detect that it is not moving relative to the environment despite causing the wheels to rotate. In such an instance, the determined plan may involve freeing the robotic chassis from the one or more features that may be obstructing the robotic chassis. In another example, the robotic system may detect that the robotic chassis is flipped upside down, and the determined plan may involve flipping the robotic chassis over. Other examples are possible as well.

Figure 5:
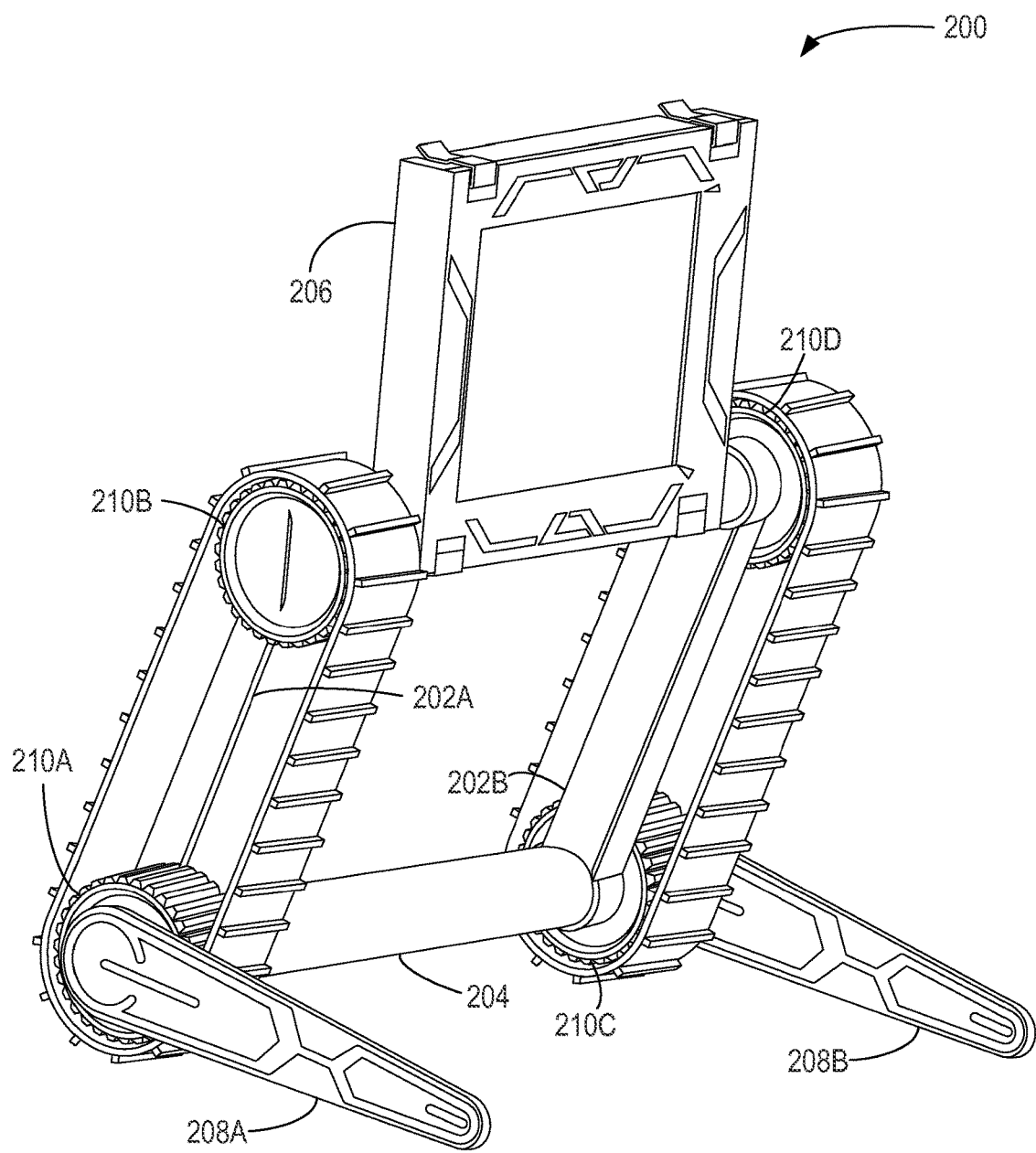
FIG. 5 is a perspective view of the example robotic system in a fourth configuration.

FIG. 5 is a perspective view of the robotic chassis 200 in an example target position. An instance of method 400 may position the robotic chassis 200 in such an example target position. This target position may be used to raise a tablet computer above a support surface, thereby raising respective perspective of one or more sensors of the tablet computer. Raising the respective perspective of the one or more sensors may have advantages for various applications, such as telepresence, security, or search and rescue.

Referring back to FIG. 4, at block 404, the method may involve initiating a rotation of a rigid case. For instance, control system 102 of FIG. 1 may initiate a rotation of the rigid case 206 of FIG. 2A, 2B, or 2C. Such a rigid case may have a proximal end that is rotatably coupled between respective side members of the robotic chassis at respective first ends of the side members between the side members about a first transverse axis, as shown by rigid case 206 relative to side members 202A and 202B. One or more actuators may drive the rotation of the rigid case about the first transverse axis.

The implementation may also involve initiating a rotation of one or more of a first arm and a second arm. For instance, a control system may initiate a rotation of arms 208A and 208B about a second transverse axis that is parallel to the first transverse axis. The arms may be rotatably coupled outside of the respective side members of the robotic chassis at respective second ends of the side members, as shown by arms 208A and 208B in FIG. 2A, 2B, or 2C. The control system may rotate the first arm and the second arm in respective clockwise or counterclockwise directions about the second transverse axis. In one example, the control system may initiate a rotation of the arms downward towards a support surface. Contact between the arms and support surface may lift respective ends of the side members upward relative to the respective second ends of the side members. One or more actuators may drive the rotation of the arms about the second transverse axis.

Figure 6A:
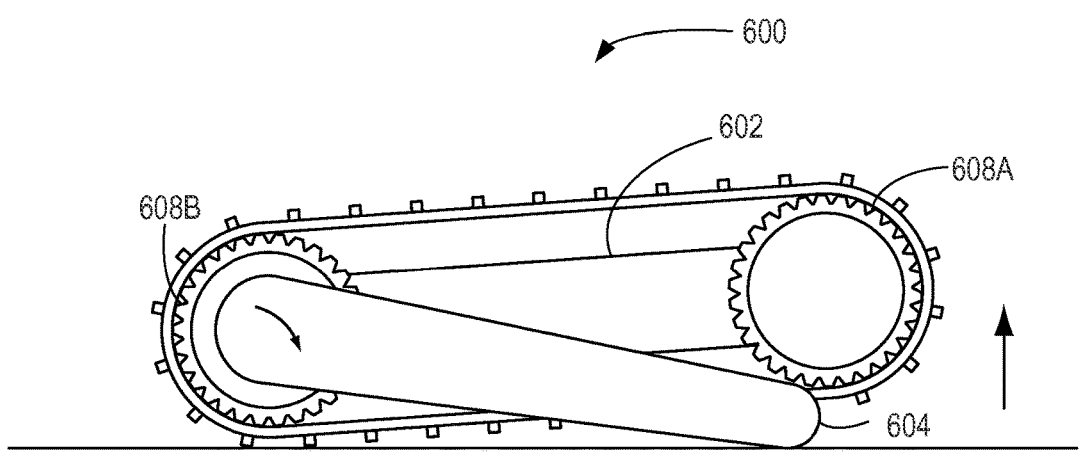
FIG. 6A is a side view of an example robotic system in a first stage of a sequence.

FIG. 6A shows a side view of an example robotic chassis 600 in a first stage of a sequence to position the robotic chassis 600 in a target position in which the rigid case is perpendicular to and lifted above a support surface. Robotic system 600 includes a frame 602, arms 604, a rigid case 606 (not shown), and first wheels 608A and second wheels 608B mounted at opposite ends of the frame 602. In FIG. 6A, a tablet computer (or other control system) has initiated respective rotations of the arms 604 downward toward a support surface, as shown. Contact by the arms 604 with the support surface has lifted a first end (i.e., an end to which wheels 608A are coupled) of the robot chassis 600 off of the support surface.

While rotating the arms 604 downward, the tablet computer may retard the rotations of wheels 608B. Such an operation may hold the frame 602 in position relative to the support surface while the arms 604 are lifting the first end of the robot chassis 600 off of the support surface (i.e., prevent the robotic chassis 600 from moving to the left). In one example, the tablet computer may cause an actuator to retard rotation of the wheels 608B. Alternatively, the tablet computer may cause a brake to retard the rotation of the wheels 608B. Other examples are possible as well.

Figure 6B:
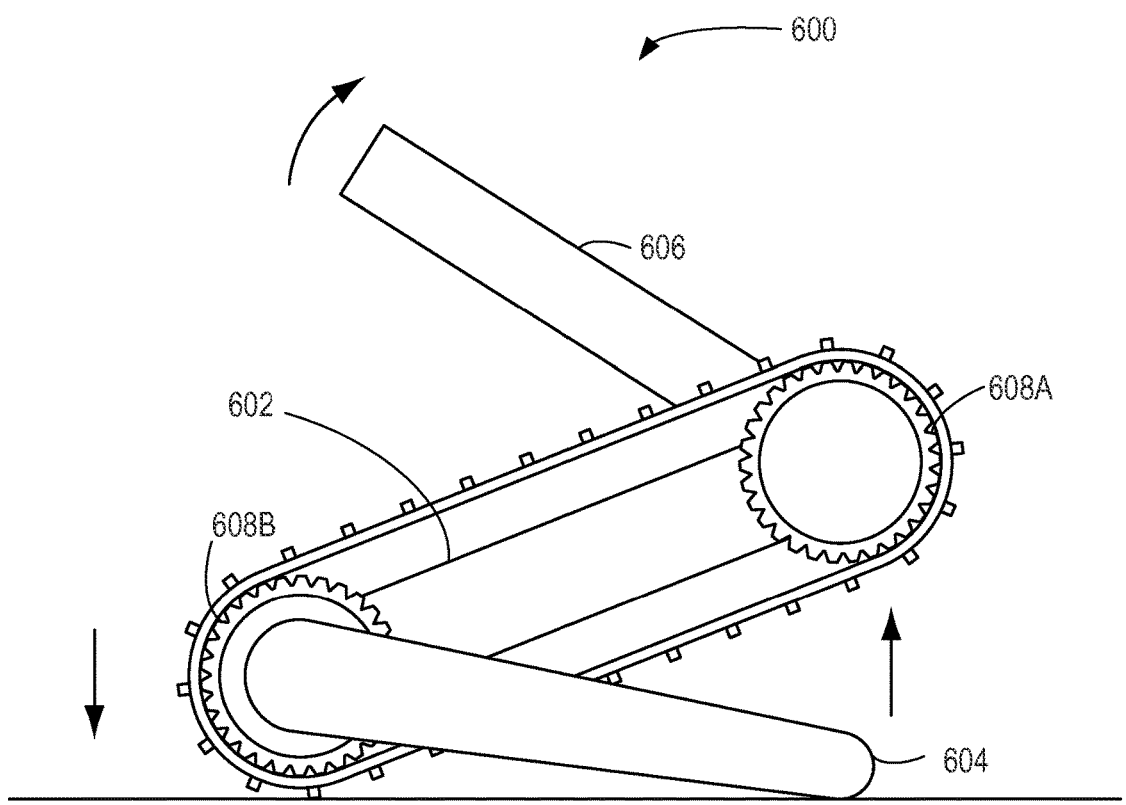
FIG. 6B is a side view of the example robotic system in a second stage of the sequence.

FIG. 6B shows a side view of the example robotic chassis 600 in a second stage of the sequence to position the robotic chassis 600 in the target orientation. Compared to FIG. 6A, the arms 604 have further rotated to lift the first end of the frame 602 higher relative to the support surface. Such a rotation also lifts the rigid case 606 further above the support surface, thereby altering the position of the tablet computer. The tablet computer has also initiated a rotation of the rigid case 606, as shown. Such a rotation may change the height and orientation of a tablet computer mounted in the rigid case. The arms 604 and the rigid case 606 are capable of rotating concurrently because the arms 604 rotate outside of the frame and the rigid case 606 rotates inside the frame (e.g., between respective side members, as shown in FIGs. 2A, 2B, and 2C).

Referring back to FIG. 4, at block 406, the method may involve determining that the tablet computer is at the target orientation based on data from at least one orientation sensor of the tablet computer. The orientation sensor may be any suitable sensor configured to generate data indicative of orientation, such as an accelerometer or IMU of sensing system 110. Within examples, the tablet computer (or other control system) may receive such data at various intervals, such as periodically, or perhaps when data from the sensor is available. After receiving such data, the tablet computer may determine whether or not the tablet computer is at the target orientation. For instance, the tablet computer may compare an orientation indicated by the data to the target orientation.

After initiating the rotation of the rigid case about the second transverse axis, the implementation may involve determining that the tablet computer is at the target height. Such a determination may be based on data from at least one height sensor of the tablet computer. The height sensor may include an accelerometer or an IMU of the tablet computer, among other examples. After receiving data from such a sensor, the tablet computer may compare a height indicated by the data to the target height, and determine that the tablet computer is at the target height (or perhaps that the tablet computer is at a height other than the target height).

Figure 6C:
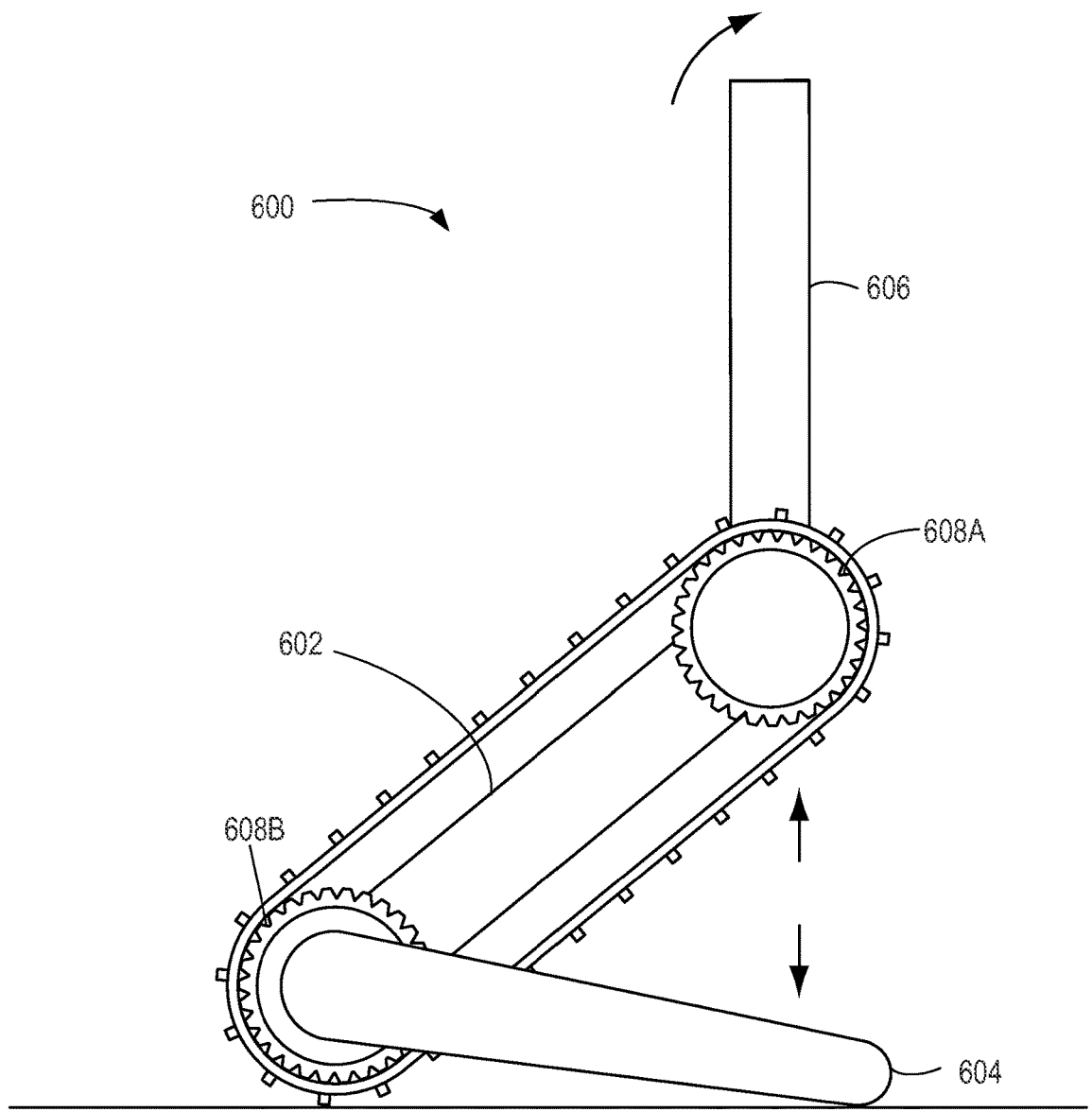
FIG. 6C is a side view of the example robotic system in a third stage of the sequence.

FIG. 6C shows a side view of the example robotic chassis 600 in a third stage of the sequence to position the robotic chassis 600 in the target orientation. Compared to FIG. 6B, the arms 604 have further rotated to lift the first end of the frame 602 higher relative to the support surface and up to the target height. The rigid case 606 has further rotated to the target orientation in which the rigid case is perpendicular to the support surface.

In some implementations, the tablet computer may determine that other components of the robotic system are at respective target positions. Such a determination may be made in addition to the determinations noted above or as an alternative to such determinations. In one example, the robotic system may include one or more second sensors that are not part of the tablet computer. Such sensors may be mounted to a frame of the robotic system, or on one or more arms of the robotic system, among other alternatives. The tablet computer may rotate various components of the robotic device to position such second sensors at respective target positions.

At block 408 in FIG. 4, the method may involve halting the rotation of the rigid case about the first transverse axis to position the tablet computer in the target orientation. For instance, in response to determining that the tablet computer is at the target orientation, the tablet computer may halt the rotation of the rigid case. Halting the rotation may involve causing one or more actuators that are configured to rotate the rigid case to stop rotating the rigid case and hold the rigid case in the target orientation. For instance, referring back to FIG. 6C, the tablet computer may halt the rotation of the arms 604 at the target height. Further, the tablet computer may halt the rotation of the rigid case 606 at the target orientation. These operations may facilitate positioning the tablet computer at the target position.

As noted above, in some cases, the target position may involve a target location. In such an example, the plan to move the robotic chassis to the target position may further include a path to a target location. The robotic system may then move to the target location as part of positioning the tablet computer in the target position. In one example, a tablet computer may cause one or more wheels (e.g., wheels 210A, 210B, 210C, and/or 210D) to rotate and thereby move the robotic chassis along the path to the target location. After causing the one or more wheels to rotate, the tablet computer may determine that the tablet computer is at the target location based on data from at least one location sensor of the tablet computer (e.g., a GPS sensor). Then, in response to determining that the tablet computer is at the target location, the tablet computer may halting the rotation of the one or more wheels to position the tablet computer at the target location.

Figure 7A:
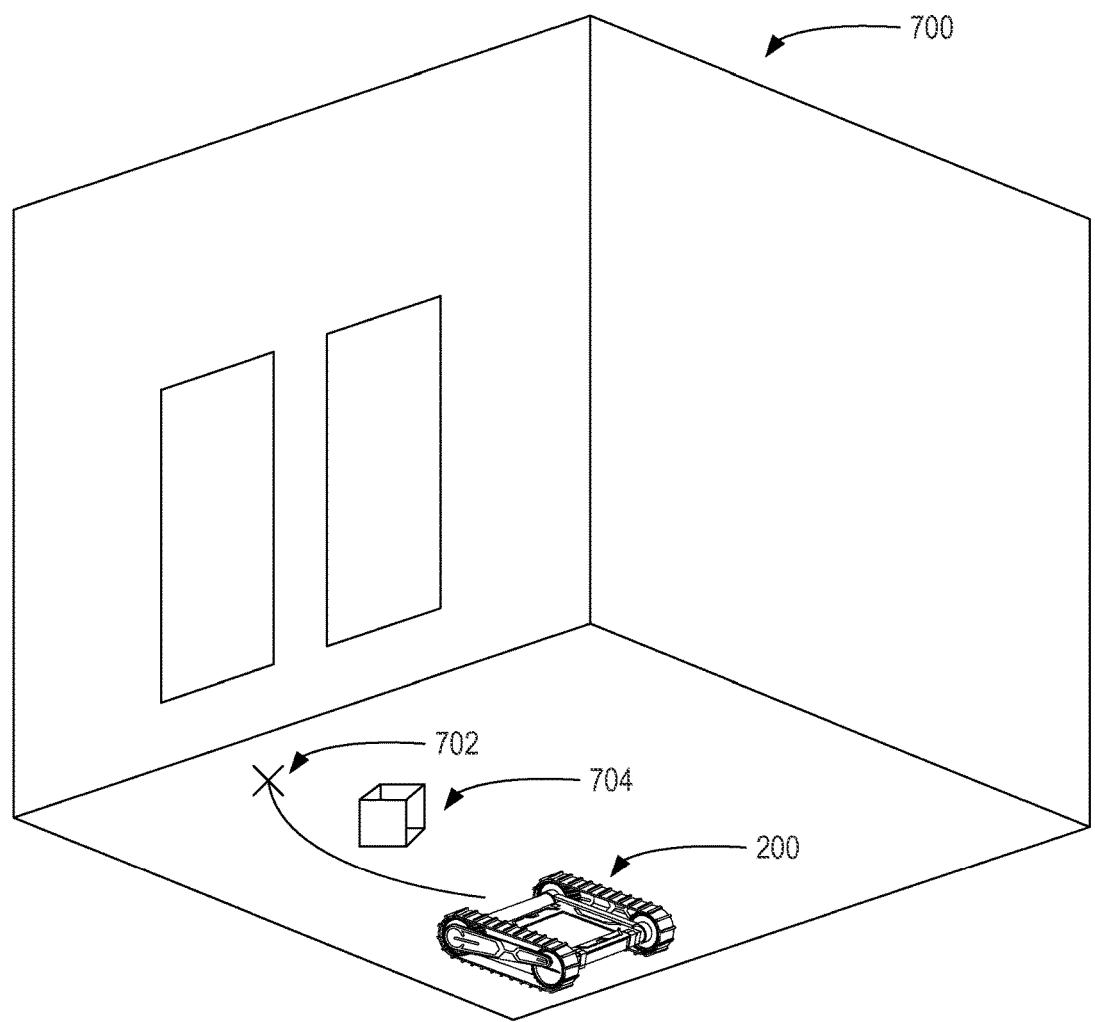
FIG. 7A is a perspective view of an example robotic system and a target location.

FIG. 7A shows the robotic chassis 200 in an example environment 700 that includes a path to a target location 704 around an obstacle 704. The tablet computer may determine the path based on data from one or more sensors. For instance, the tablet computer may detect the obstacle 704 by way of one or more perception sensors such as a lidar system, a stereocamera, and/or a rangefinder. Then, perhaps based on GPS data (e.g., by way of GPS navigation) or IMU data (e.g., by way of dead reckoning), the tablet computer may determine the path to the target location.

Figure 7B:
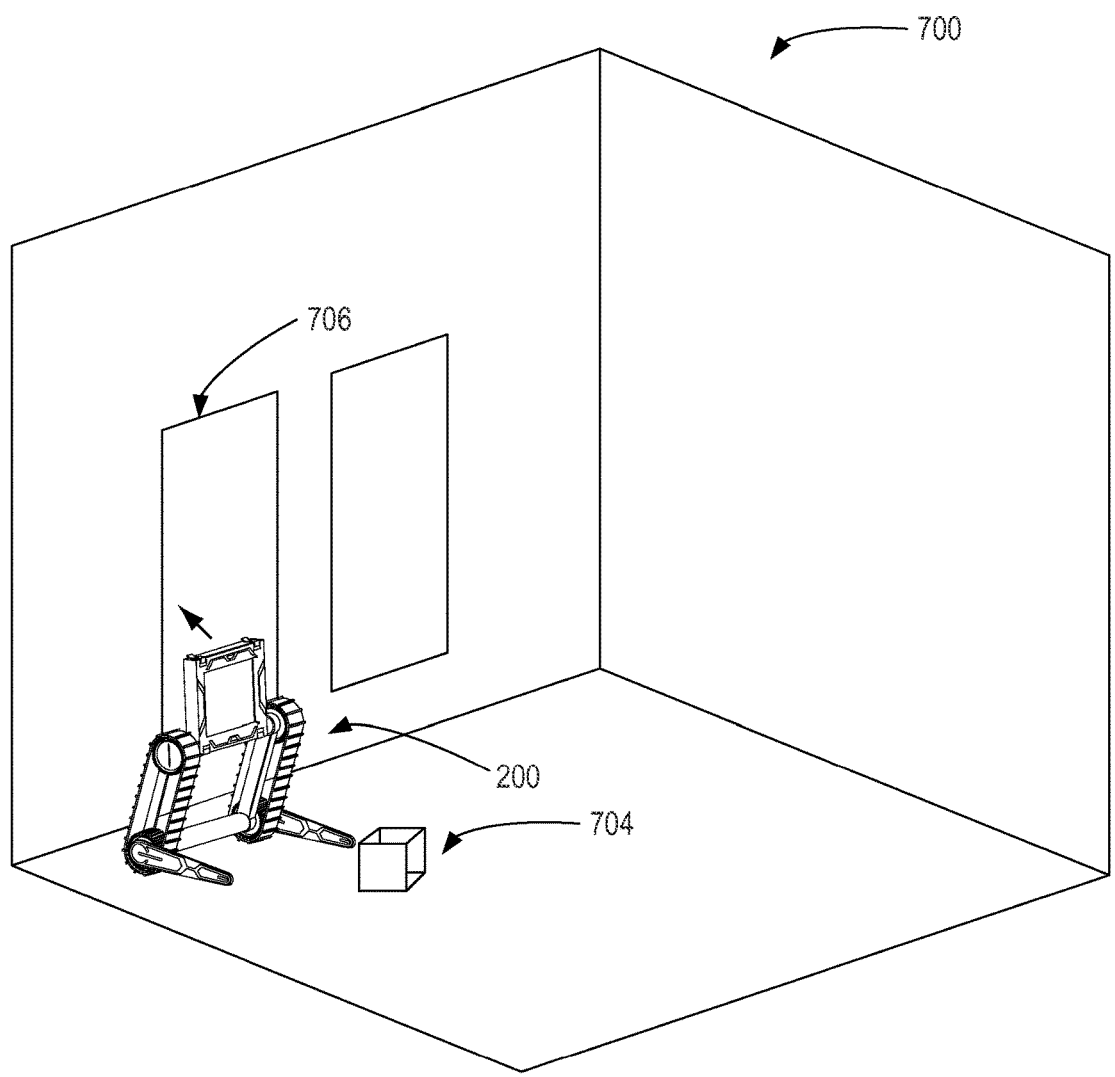
FIG. 7B is a perspective view of an example robotic system at the target location.

FIG. 7B next shows the robotic chassis 200 after the tablet computer causes the robotic chassis 200 to navigate to the target location 702. Further, the tablet computer has caused the rigid case 206 and arms 208A and 208B to rotate to bring the rigid case (containing the tablet computer) to a target height and target orientation. In such a target position, a rear-facing camera of the tablet computer may capture imaging data through the window 706.

After positioning the rigid case in the target position, the tablet computer may cause at least one sensor of the tablet computer to capture sensor data from a perspective of the target position. As noted above, such data capture from a target position may have various applications, including home security, telepresence, and search and rescue, among other examples. In one example, after positioning the tablet computer at the target position, the tablet computer may cause a perception sensor (e.g., a camera) to generate imaging data from a perspective that is parallel to the target orientation.

Figure 8:
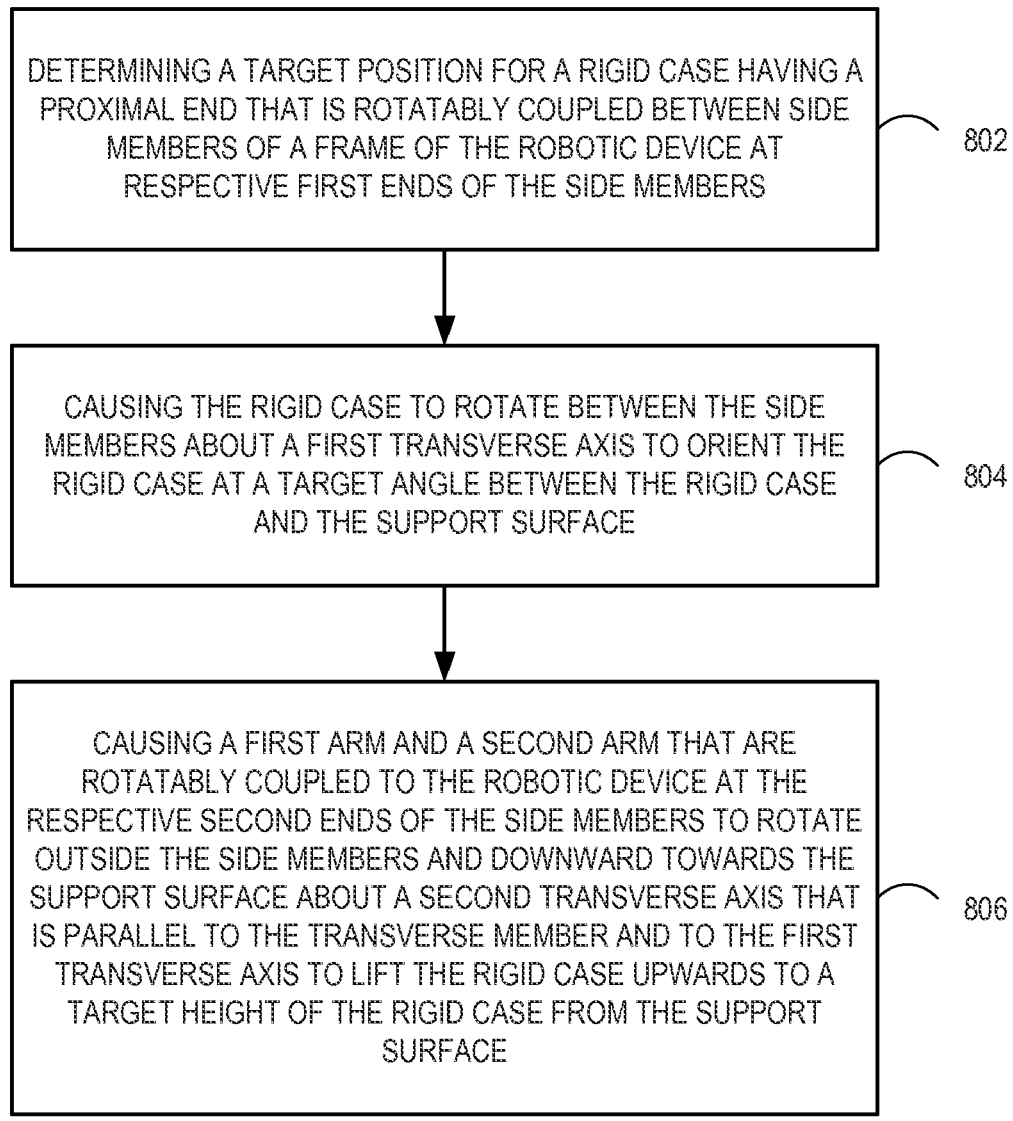
FIG. 8 is a flow chart illustrating another example method for positioning a tablet computer in a target position.

FIG. 8 is next a flow chart illustrating another example method for positioning a tablet computer in a target position. This example method may be used in combination with a plan to move to a target position (e.g., as noted above in connection with FIG. 4 and method 400) or the method may be used in connection with commands that cause a robotic system to position a tablet computer in a target position. For instance, a robotic system may receive commands over a network interface that cause the robotic system to position a tablet computer in a target position.

At block 802, a controller of a robotic device (e.g., a tablet computer mounted in the rigid case) may determine a target position for a rigid case having a proximal end that is rotatably coupled between side members of a frame of the robotic device at respective first ends of the side members. As noted above, a target position may include various components, such as a target height of the rigid case from a support surface or a target angle between the rigid case and the support surface.

At block 804, the controller may cause the rigid case to rotate between the side members about a first transverse axis to orient the rigid case at a target angle between the rigid case and the support surface. For instance, a tablet computer may cause rigid case 206 of robotic chassis 200 to rotate between side members 202A and 202B to orient rigid case 206 at a target angle.

At block 806, the controller may cause a first arm and a second arm that are rotatably coupled to the robotic device at the respective second ends of the side members to rotate outside the side members and downward towards the support surface about a second transverse axis that is parallel to the transverse member and to the first transverse axis. Such a rotation may lift the rigid case upwards to the target height of the rigid case from the support surface. For instance, a tablet computer may cause arms 208A and 208B to rotate and thereby lift the robotic chassis 200 or a portion thereof.

As noted above, FIGS. 4 and 8 are flowcharts illustrating example operations that may position a robotic device. These operations, for example, could be used with the robotic system 100 in FIG. 1 or the robotic chassis 200 in FIG. 2A, 2B, or 2C, for example, or may be performed by a control system (e.g., a control system within a chassis or communicatively coupled to the chassis, such as a tablet computer including a control system) or a combination of any components of the robotic system 100 in FIG. 1 or the robotic chassis 200 in FIG. 2A, 2B, or 2C. FIGS. 4 and 8 may include one or more operations, functions, or actions as illustrated by one or more of blocks 402-408 and 802-806. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for FIG. 4, FIG. 8, and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and random access memory (RAM). The computer-readable medium may also include other non-transitory media, such as secondary or persistent long term storage, like read only memory (ROM), optical or magnetic disks, compact-disc read only memory (CD-ROM), for example. The computer-readable media may also be any other volatile or non-volatile storage system. The computer-readable medium may be considered a computer-readable storage medium, a tangible storage device, or other article of manufacture, for example. The program code (or data for the code) may also be stored or provided on other media including communication media. For instance, the commands may be received on a wireless communication media, for example.

In addition, for FIG. 4, FIG. 8, and other processes and methods disclosed herein, each block may represent circuitry that is arranged to perform the specific logical functions in the process.

Functions of FIG. 4 and FIG. 8 may be fully performed by one control system, or may be distributed across multiple control systems (e.g., among two or more tablet computers that are communicatively coupled to one another). In some examples, the control system may receive information from sensors of a robotic system, or the control system may receive the information from a processor that collects the information. The control system could further communicate with a remote control system (e.g., a control system on another robotic device) to receive information from sensors of other devices, for example.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
   determining a target location and a target orientation for a tablet computer that is mounted to a rigid case of a robotic chassis, wherein a proximal end of the rigid case is rotatably coupled between respective side members of the robotic chassis at respective first ends of the side members about a first transverse axis;
   causing one or more wheels that are rotatably coupled to the robotic chassis to rotate about respective wheel axes that are parallel to the first transverse axis to move the robotic chassis along a path to the target location;
   initiating a rotation of the rigid case about the first transverse axis to position the tablet computer in the target orientation; and
   after positioning the tablet computer at the target location, causing a perception sensor to generate imaging data from a perspective that is parallel to the target orientation.

2. The method of claim 1, wherein causing the one or more wheels to rotate comprises causing rotation of at least one first wheel rotatably coupled to a first side member of the respective side members and at least one second wheel rotatably coupled to a second side member of the respective side members.

3. The method of claim 1, further comprising:
   after initiating the rotation of the rigid case about the first transverse axis, determining that the tablet computer is at the target orientation based on data from at least one orientation sensor of the tablet computer; and in response to determining that the tablet computer is at the target orientation, halting the rotation of the rigid case about the first transverse axis to position the tablet computer in the target orientation.

4. The method of claim 1, further comprising:
determining a target height for the tablet computer; and
initiating a rotation, by a first arm and a second arm having respective proximal ends that are rotatably coupled to the robotic chassis at respective second ends of the side members of the robotic chassis, downward towards a support surface and outside the respective side members about a second transverse axis that is parallel to the first transverse axis to lift the respective first ends of the side members upward relative to the respective second ends of the side members to position the tablet computer at the target height.

5. The method of claim 4, further comprising:
after initiating the rotation of the rigid case about the second transverse axis, determining that the tablet computer is at the target height based on data from at least one height sensor of the tablet computer; and
in response to determining that the tablet computer is at the target height, halting the rotation of the first arm and the second arm about the second transverse axis to position the tablet computer at the target height.

6. The method of claim 4, wherein the one or more wheels comprise one or more second wheels rotatably coupled to the robotic chassis at the respective second ends of the side members, and the method further comprises:
while rotating the first arm and the second arm downward about the second transverse axis, causing an actuator to retard rotation of the one or more second wheels to hold the robotic chassis in a position relative to the support surface.

7. The method of claim 1, further comprising:
determining that the tablet computer is at the target location based on data from at least one location sensor of the tablet computer; and
in response to determining that the tablet computer is at the target location, halting rotation of the one or more wheels to position the tablet computer at the target location.

8. The method of claim 1, further comprising:
initiating a rotation, by a first arm and a second arm having respective proximal ends that are rotatably coupled to the robotic chassis at respective second ends of the side members of the robotic chassis, to position respective distal ends of the arms above the respective proximal ends.

9. The method of claim 8, wherein initiating the rotation of the rigid case comprises causing the robotic chassis to transform into a case-forward configuration in which a front side of the rigid case is facing away from the arms.

10. A method comprising:
determining a target location and a target orientation for a tablet computer that is mounted to a rigid case of a robotic chassis, wherein a proximal end of the rigid case is rotatably coupled between respective side members of the robotic chassis at respective first ends of the side members about a first transverse axis;
causing one or more wheels that are rotatably coupled to the robotic chassis to rotate about respective wheel axes that are parallel to the first transverse axis to move the robotic chassis along a path to the target location;
initiating a rotation of the rigid case about the first transverse axis to position the tablet computer in the target orientation;
after initiating the rotation of the rigid case about the first transverse axis, determining that the tablet computer is at the target orientation based on data from at least one orientation sensor of the tablet computer; and
in response to determining that the tablet computer is at the target orientation, halting the rotation of the rigid case about the first transverse axis to position the tablet computer in the target orientation.

11. The method of claim 10, wherein causing the one or more wheels to rotate comprises causing rotation of at least one first wheel rotatably coupled to a first side member of the respective side members and at least one second wheel rotatably coupled to a second side member of the respective side members.

12. The method of claim 10, further comprising:
determining a target height for the tablet computer; and
initiating a rotation, by a first arm and a second arm having respective proximal ends that are rotatably coupled to the robotic chassis at respective second ends of the side members of the robotic chassis, downward towards a support surface and outside the respective side members about a second transverse axis that is parallel to the first transverse axis to lift the respective first ends of the side members upward relative to the respective second ends of the side members to position the tablet computer at the target height.

13. The method of claim 12, further comprising:
after initiating the rotation of the rigid case about the second transverse axis, determining that the tablet computer is at the target height based on data from at least one height sensor of the tablet computer; and
in response to determining that the tablet computer is at the target height, halting the rotation of the first arm and the second arm about the second transverse axis to position the tablet computer at the target height.

14. The method of claim 10, further comprising:
determining that the tablet computer is at the target location based on data from at least one location sensor of the tablet computer; and
in response to determining that the tablet computer is at the target location, halting rotation of the one or more wheels to position the tablet computer at the target location.

15. The method of claim 10, further comprising:
initiating a rotation, by a first arm and a second arm having respective proximal ends that are rotatably coupled to the robotic chassis at respective second ends of the side members of the robotic chassis, to position respective distal ends of the arms above the respective proximal ends.

16. A method comprising:
determining a target location and a target orientation for a tablet computer that is mounted to a rigid case of a robotic chassis, wherein a proximal end of the rigid case is rotatably coupled between respective side members of the robotic chassis at respective first ends of the side members about a first transverse axis;
causing one or more wheels that are rotatably coupled to the robotic chassis to rotate about respective wheel axes that are parallel to the first transverse axis to move the robotic chassis along a path to the target location;
determining that the tablet computer is at the target location based on data from at least one location sensor of the tablet computer;

in response to determining that the tablet computer is at the target location, halting rotation of the one or more wheels to position the tablet computer at the target location; and initiating a rotation of the rigid case about the first transverse axis to position the tablet computer in the target orientation.

17. The method of claim 16, wherein causing the one or more wheels to rotate comprises causing rotation of at least one first wheel rotatably coupled to a first side member of the respective side members and at least one second wheel rotatably coupled to a second side member of the respective side members.

18. The method of claim 16, further comprising:
determining a target height for the tablet computer; and
initiating a rotation, by a first arm and a second arm having respective proximal ends that are rotatably coupled to the robotic chassis at respective second ends of the side members of the robotic chassis, downward towards a support surface and outside the respective side members about a second transverse axis that is parallel to the first transverse axis to lift the respective first ends of the side members upward relative to the respective second ends of the side members to position the tablet computer at the target height.

19. The method of claim 18, further comprising:
after initiating the rotation of the rigid case about the second transverse axis, determining that the tablet computer is at the target height based on data from at least one height sensor of the tablet computer; and
in response to determining that the tablet computer is at the target height, halting the rotation of the first arm and the second arm about the second transverse axis to position the tablet computer at the target height.

20. The method of claim 16, further comprising:
initiating a rotation, by a first arm and a second arm having respective proximal ends that are rotatably coupled to the robotic chassis at respective second ends of the side members of the robotic chassis, to position respective distal ends of the arms above the respective proximal ends.

* * * * *